United States Patent [19]
Norris et al.

[11] Patent Number: 4,610,795
[45] Date of Patent: Sep. 9, 1986

[54] PEROXYGEN BREAKER SYSTEMS FOR WELL COMPLETION FLUIDS

[75] Inventors: Robert D. Norris, Hightstown; Richard A. Brown, Trenton; Gaylen R. Brubaker, Hightstown, all of N.J.

[73] Assignee: FMC Corporation, Philadelphia, Pa.

[21] Appl. No.: 763,169

[22] Filed: Aug. 7, 1985

[51] Int. Cl.$^4$ .............................................. E21B 43/26
[52] U.S. Cl. ................................ 252/8.551; 166/278; 166/308
[58] Field of Search ...................... 252/8.55 R, 8.55 C; 166/283, 308, 278

[56] References Cited

U.S. PATENT DOCUMENTS

| | | | |
|---|---|---|---|
| 3,014,863 | 12/1961 | Priest | 252/8.55 |
| 3,727,688 | 4/1973 | Clampitt | 166/283 |
| 3,827,898 | 8/1974 | Podlas | 252/8.55 X |
| 4,137,182 | 1/1979 | Golinkin | 252/8.55 R |
| 4,144,179 | 3/1979 | Chatterji | 252/8.55 R |
| 4,169,798 | 10/1979 | DeMartino | 252/8.55 |
| 4,202,795 | 5/1980 | Burnham et al. | 252/332 |
| 4,234,433 | 11/1980 | Rhudy et al. | 252/8.55 D |
| 4,246,124 | 1/1981 | Swanson | 252/8.55 R |
| 4,331,543 | 5/1982 | Wilson et al. | 252/8.55 D |
| 4,389,320 | 6/1983 | Clampitt | 252/8.55 R |
| 4,552,675 | 11/1985 | Brown et al. | 252/8.55 |
| 4,560,486 | 12/1985 | Hinkel | 252/8.55 |

Primary Examiner—Herbert B. Guynn
Attorney, Agent, or Firm—Richard E. Elden; Robert L. Andersen

[57] ABSTRACT

A hydraulic process has been developed and a process to treat subterranean formations whereby the medium can maintain for a period of time a sufficient viscosity to function as a hydraulic medium and optionally to support particulate matter. Subsequently, the viscosity of the medium decreases to facilitate the removal of the medium.

4 Claims, No Drawings

PEROXYGEN BREAKER SYSTEMS FOR WELL COMPLETION FLUIDS

This invention relates to a composition and to a metod useful for hydraulically treating a subterranean formation. The invention is particularly useful for creating and maintaining a fracture in a subterranean formation to stimulate the flow of a fluid therefrom or for placing a permeable or impermeable pack in contact with a formation to facilitate or control fluid flow into or out of the formation. More particularly, the invention relates to hydraullic media containing nitrite to inhibit premature breaking by a peroxygen compound.

Treatment of a subterranean formation with a hydraulic medium to create and maintain a fracture through which a fluid can flow is usually practical by injecting a hydraulic medium with a high viscosity. The purpose of the high viscosity can be either to prevent the premature loss of the hydraulic medium through a thief zone or to suspend solid particles in the liquid. Such solid particles may be deposited in the fracture and serve as propping agents to maintain the integrity of the fracture. Solids suitable as propping agents include sand, gravel, walnut shells and the like.

Solid particles may also be used to form an impervious consolidated pack in contact with a subterranean formation to seal off a porous formation. Typical application include sealing a porous formation to prevent loss of oil or gas from a well, or to block groundwater from flowing through cracks or joints into a sewer or basement.

Subterranean formations may also be treated with a hydraulic medium to place a permeable pack adjacent to an unconsolidated formation to hold the formation in place while withdrawing a fluid from it. A typical application is recovering petroleum from a loose sand formation. Many other applications to control the flow of a fluid at any natural or artificial subterranean interface will be apparent to those skilled in the art.

Usually, aqueous compositions, including brines, are selected for use as a hydraulic medium because of the ready availability and the low cost of water. The hydraulic medium is usually formulated with thickening agents and other additives well-known in the art to be useful under the conditions within the specific subterranean geological formations.

A wide variety of hydratable polymeric materials have been found useful as thickening agents in such hydraulic media. These include hydratable polysaccharides, polyacrylamides, and polyacrylamide copolymers. Particularly desirable polysaccharides include galactomannan gums, derivatives thereof, and cellulose derivatives. Typical polysaccharides include: guar gums, locust bean gum, karagya gum, sodium caroxyethyl guar, hydroxyethyl guar, hydroxypropyl guar, sodium hydroxymethyl cellulose, sodium carboxymethyl-hydroxyethyl cellulose, and hydroxyethyl cellulose.

Optionally, cross-linking agents may be added which increase the maximum temperature at which the hydratable polymers will retain the desired high viscosity. These cross-linking agents are well known in the art and include polyvalent metal ions, such as chromium (III), aluminum (III), titanium (IV) and polyvalent anions, such as borates.

The combination of pH, the hydratable polymeric material and the cross-linking agent selected can be important factors in obtaining and maintaining the desired viscosity. A pH of 3 or less will frequently cause breaking or loss of viscosity; a pH of 10 or more the solubility of many of the polymers is insufficient to provide a viscous solution. It is usually desirable that the pH of the hydraulic medium is maintained in the neutral range between 5 to 7.5, which tends to reduce corrosion which would occur at a lower pH and to reduce the cost of buffers or other additives; but, by proper choice of material, the effective pH range can be from 1 to 12.

At the completion of the hydraulic treatment, the viscosity of the hydraulic liquid is generally reduced to facilitate its removal from the vicinity of the treated formation. A substantial reduction of viscosity of the hydraulic liquid is generally termed "breaking".

The viscosity of hydraulic media formulated with such hydratable polymeric materials will reduce or break in time as the result of either biological action or high temperatures. The breaking can be accelerated by the use of chemical additives called "breakers", such as enzymes, acids, and oxidizing agents. Peroxygen compounds are well known breakers because the peroxygen compounds readily form effective free radicals under the usual conditions of use and because no objectionable residue remains to cause disposal problems.

U.S. Pat. No. 4,144,179, to Chatterji discloses that the minimum practical temperature for peroxygen breakers can be decreased from 50° C. to about 20° C. by adding a soluble metal salt wherein the oxidation number of the metal ion is less than the highest possible oxidation number for the metal ion. The metal salts are accelerators which increase the rate of free radical formation by peroxygens and thereby decrease the temperature necessary to generate sufficient free radicals to depolymerize the polymer in a relatively short time. The patent discloses as accelerators cuprous, ferrous, stannous, cobaltous, chromous, nickleous, titanous, manganous, and arsenous salts of the halides, sulfates, and nitrates.

The patent to Chatterji recognizes that it is necessary to delay the time at which the breaking takes place, but the only means suggested is by adding the accelertor as a slowly-soluble salt of the metal. As a result, a sufficient concentration of metal ion will not build up in the composition to cause breaking under ideal conditions until after the treatment of the subterranean formation is completed. This method of control is undesirable because unplanned factors can affect the rate of solution of the solid metal salts, such as the pH and temperature within the formation, as well as the presence of unexpected anions, such as silicates or carbonates. In addition, the metal ions may be physically removed from the solution by natural zeolites, or alternatively, additional ions may be leached from local mineral deposits in the formation.

U.S. Pat. No. 4,202,795 to Burnam et al. also discloses the desirability of delaying the effect of the breakers. The Burnam et al. patent teaches the use of a coated pellet containing the accelerator, the coating comprising a solid, hydratable polymeric material similar to the polymers used to increase the viscosity of the hydraulic medium. The method of the Burnam et al. patent has the disadvantages of merely delaying the release of the accelerator; it also has the disadvantage of requiring the blending of pellets into the viscous composition. Furthermore, the pellets may be subject to attrition which may cause a premature release of the accelerator. In addition, after the pellets have been manufactured there are no means to adjust the timing of the release of the accelerator in response to unexpected conditions observed in the formation, particularly at the higher temperatures encountered at increased depths.

U.S. Pat. application Ser. No. 524,680 filed Aug. 19, 1983, now U.S. Pat. No. 4,552,675, teaches that free radical scavengers such as hydroxylated aromatic compounds and unsaturated alcohols are effective in delaying the effect of such breakers in hydraulic treating fluids. While effective in retarding breaking, the costs are appreciable because the scavengers must be used at high concentrations.

The present invention overcomes these disadvantages of the prior art by providing an aqueous hydraulic medium containing nitrite ion or a source of nitrite ion to control and inhibit the breaking of a hydraulic medium containing a peroxygen compound as a breaking agent.

The present invention is an aqueous composition which is suitable as a hydraulic medium for treating a subterranean formation. This aqueous composition comprises (1) a hydratable polymeric material, (2) a peroxygen compound capable of subsequently generating free radicals in an amount sufficient to reduce the viscosity of the aqueous composition, and (3) a nitrite ion source. Optionally, the composition may also contain an organic hydroxyl compound effective as a free radical scavenger.

The efficacy of nitrite ion to inhibit the breaking of a hydraulic medium by a peroxygen compound is unexpected. It is well known that nitrite ions can reduce peroxygen compounds. It would be expected that nitrite ions would function as part of a redox system and accelerate, rather than inhibit, breaking of a hydraulic medium by a peroxygen compound. In addition, the inhibitors taught by the prior art are compounds cabale of forming low energy free radicals, and the nitrite ion is not known to exist as a free radical.

Nitrite ions may be incorporated into the hydraulic medium from any convenient source such as nitrous acid, a nitrogen oxide which will yield nitrous acid on hydrolysis, or a nitrite salt. Sodium nitrite is particularly desirable because of its ready availability and low cost. For convenience the quantity of nitrite ion incorporated into a formulation is expressed as the equivalent quantity of sodium nitrite. Generally, from about 0.1 to 10 parts by weight of sodium nitrite per part by weight of the peroxygen compound is effective to inhibit premature breaking, and from 0.5 to 5 parts by weight of sodium nitrite per part by weight of the peroxygen compound is preferred.

Unexpectedly, a conventional organic free radical scavenger selected from the group consisting of unsaturated alcohols, phenols, allylic monomers and mixtures thereof, and a nitrite ion in combination are more effective in inhibiting premature breaking than either component alone. This synergism suggests that the inhibiting effect of a nitrite ion is not related to free radical formation for then the effect would be at best additive. The nitrite ion may be added to the hydraulic medium alone, or with a free radical scavenger either to delay the time at which the hydraulic medium will break, that is, lose viscosity, or to permit the hydraulic medium to maintain the desired viscosity at higher temperatures.

The usage of the free radical scavengers will vary according to the efficacy of the compounds and the desired condition of use. Generally, from 0.01 to 5 parts of a free radical scavenger is added per hundred parts of the hydraulic medium; preferably 0.05 to 2.5 parts of the scavenger is added per hundred parts of aqueous solution. This is equivalent to 0.1 to 10 parts by weight of the free radical scavenger per part by weight of peroxygen compound in the hydraulic medium and preferably 0.5 to 5 parts by weight of the free radical scavenger are used per part by weight of the peroxygen compound.

One skilled in the art will normally select the ingredients of the hydraulic medium on an overall cost-performance basis or on an availability basis.

Any convenient hydratable polymeric material may be used, such as the hydratable polysaccharides, polysaccharide derivatives, polyacrylamides, and polyacrylamide copolymers conventionally used. From 1 to 100 kilograms of a hydrated polymeric material per cubic meter (1 to 100 g/liter) of the hydraulic medium is generally satisfactory to provide a usable viscosity.

Similarly, any convenient peroxygen may be selected as the breaker. Usually it is desirable to use a relatively inexpensive peroxygen compound which will readily generate free radicals at the temperatures found in the formation. It is generally preferable to use a peroxygen compound selected from the group consisting of hydrogen peroxide, t-butylhydroperoxide, the ammonium and alkali metal salts of monopersulfuric acid, and ammonium and alkali metal salts of dipersulfuric acid. The peroxygen compound may be present in the hydraulic medium in an amount equal to from 1 to 20 parts by weight of the hydratable polymeric material present therein.

The following examples are presented to illustrate the practicing of the invention.

EXAMPLES

The experimental procedures used in Examples 1 to 21 were variations of the following example—as indicated in the tables.

A viscous solution or gel was formed by dissolving 3.8 g of a hydratable polymeric material, such as hydroxypropyl guar, in 380 ml water. After complete dissolution, a peroxygen breaker, usually 0.2 g ammonium persulfate, was added followed by any other additives as specified, such as activators or free radical scavengers as inhibitors. The pH of the solution was adjusted to pH 6.5 using 10% sulfuric acid or buffered with sodium carbonate. The solution was allowed to stand at 60° C. The viscosity was determined periodically using an NL Baroid Rehometer at 600 rpm.

Examples 3 and 4 demonstrate that the nitrite ion which was provided as sodium nitrite is more effective on a weight basis than known free radical scavengers, such as, allyl alcohol (Examples 5 and 6), phenol (Examples 7 and 8) and 2-butene-1,4-diol (Example 15). The synergistic effects with free radical scavengers can be seen, for example, when comparing Examples 4 and 5 with Example 15.

TABLE I

VISCOSITY OF WELL COMPLETION FLUIDS ON STANDING AT 60° C.

| Example | APS g | NaNO$_2$ g | Inhibitor Comp. | g | % Viscosity Remaining After | | | | | |
|---|---|---|---|---|---|---|---|---|---|---|
| | | | | | 2 hr. | 3 hr. | 4 hr. | 5 hr. | 6 hr. | 23 hr. |
| 1 | — | — | — | — | 92 | 86 | 84 | 83 | 82 | 82 |
| 2 | 0.2 | — | — | — | 8 | 3 | — | — | — | 3 |
| 3 | 0.2 | 2.0 | — | — | 77 | 64 | 51 | 33 | 29 | 8 |
| 4 | 0.2 | 1.0 | — | — | 32 | 14 | 11 | — | 8 | 4 |
| 5 | 0.2 | 0.0 | AA | 20 | 78 | 69 | 67 | 59 | 54 | 16 |
| 6 | 0.2 | 0.0 | AA | 10 | 63 | 16 | 8 | — | 7 | 5 |

TABLE I-continued

VISCOSITY OF WELL COMPLETION FLUIDS ON STANDING AT 60° C.

| Example | APS g | NaNO₂ g | Inhibitor Comp. | g | % Viscosity Remaining After | | | | | |
|---|---|---|---|---|---|---|---|---|---|---|
| | | | | | 2 hr. | 3 hr. | 4 hr. | 5 hr. | 6 hr. | 23 hr. |
| 7 | 0.2 | 0.0 | φ | 20 | 80 | 80 | 80 | 79 | 78 | 67 |
| 8 | 0.2 | 0.0 | φ | 10 | 85 | 82 | 79 | — | 76 | 52 |
| 9 | 0.2 | 1.0 | AA | 10 | 94 | 83 | 78 | 67 | 66 | 21 |
| 10 | 0.2 | 0.5 | AA | 5 | 83 | 78 | 76 | — | 66 | 28 |
| 11 | 0.2 | 1.0 | φ | 20 | 86 | 81 | 81 | 80 | 81 | 55 |
| 12 | 0.2 | 0.5 | φ | 10 | 83 | 71 | 66 | — | 51 | 12 |

Key
3.8 g of hydratable polymeric material in 380 ml water plus additives as indicated
APS = Ammonium Persulfate
NaNO₂ = Sodium Nitrite
AA = Allyl Alcohol
φ = Phenol

TABLE II

VISCOSITY OF WELL COMPLETION FLUIDS ON STANDING AT 60° C.

| Example | APS g | NaNO₂ g | BD g | % Viscosity Remaining After | | | |
|---|---|---|---|---|---|---|---|
| | | | | 2 hr. | 4 hr. | 6 hr. | 22 hr. |
| 13 | 0 | 0 | 0 | 92 | 84 | 82 | 82 |
| 14 | 0.2 | 0 | 0 | 5 | 3 | 3 | 3 |
| 15 | 0.2 | 0 | 6 | 37 | 8 | 5 | 4 |
| 16 | 0.2 | 1 | 6 | 63 | 28 | 17 | 5 |
| 17 | 0.2 | 2 | 6 | 71 | 41 | 23 | 7 |
| 18 | 0.2 | 4 | 6 | 60 | 35 | 18 | 4 |
| 19 | 0.2 | 0 | 12 | 51 | 13 | 7 | 5 |
| 20 | 0.2 | 2 | 12 | 81 | 59 | 35 | 13 |
| 21 | 0.2 | 4 | 12 | 71 | 55 | 38 | 14 |

Key
3.8 g of hydratable polymeric material in 380 ml water plus additives as indicated
APS = Ammonium Persulfate
NaNO₂ = Sodium Nitrite
BD = 2-butane-1,4-diol

We claim:

1. An aqueous hydraulic medium suitable for treating a subterranean formation comprising:
   a. from 1 to 100 kilograms per cubic meter of a hydratable polymeric material selected from the group consisting of polysaccharides, polysaccharide derivatives, polyacrylamides, polyacrylamide copolymers, and mixtures thereof,
   b. a peroxygen compound capable of generating free radicals selected from the group consisting of hydrogen peroxide, t-butylhydroperoxide, ammonium and alkali metal salts of monopersulfuric acid, and ammonium and alkali metal salts of dipersulfuric acid, in an amount equal to 1 to 20 parts by weight per 100 parts by weight of said polymeric material, and
   c. nitrite ions in an amount equal to 0.1 to 10 parts by weight of sodium nitrite per part by weight of the peroxygen compound in the hydraulic medium.

2. The hydraulic medium of claim 1 also comprising from 0.1 to 10 parts by weight of an organic free radical scavenger per part by weight of the peroxygen compound in the hydraulic medium, said free radical scavenger being selected from the group consisting of unsaturated alcohols, phenols, allylic monomers, and mixtures thereof.

3. A process for treating a subterranean formation comprising: introducing into the subterranean formation an aqueous hydraulic medium comprising (a) from 1 to 100 kilograms per cubic meter of a hydratable polymeric material as a thickening agent to increase the viscosity of the aqueous medium selected from the group consisting of polysaccharides, polysaccharide derivatives, polyacrylamides, polyacrylamide copolymers, and mixtures thereof, (b) as a breaker to reduce the viscosity of the aqueous medium after said medium has contacted said formation, a peroxygen compound capable of generating free radicals selected from the group consisting of hydrogen peroxide, t-butylhydroperoxide, ammonium and alkali metal salts of monopersulfuric acid, and ammonium and alkali metal salts of dipersulfuric acid, in an amount equal to 1 to 20 parts by weight per 100 parts by weight of said polymeric material, and (c) nitrite ions in an amount equal to 0.1 to 10 parts by weight of sodium nitrite per part by weight of the peroxygen compound in the hydraulic medium.

4. The process of claim 3 wherein the hydraulic medium also comprises from 0.1 to 10 parts of an organic free radical scavenger per part by weight of the peroxygen compound in the hydraulic medium, said free radical scavenger being selected from the group consisting of unsaturated alcohols, phenols, allylic monomers, and mixtures thereof.

* * * * *